(12) United States Patent
Iwaoka et al.

(10) Patent No.: US 8,010,720 B2
(45) Date of Patent: Aug. 30, 2011

(54) STORAGE SYSTEM DISPOSED WITH PLURAL INTEGRATED CIRCUITS

(75) Inventors: Yo Iwaoka, Odawara (JP); Naoki Moritoki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 300 days.

(21) Appl. No.: 12/267,886

(22) Filed: Nov. 10, 2008

(65) Prior Publication Data
US 2010/0049886 A1 Feb. 25, 2010

(30) Foreign Application Priority Data
Aug. 25, 2008 (JP) ................................. 2008-215003

(51) Int. Cl.
*G06F 3/00* (2006.01)
*G06F 5/00* (2006.01)
*G06F 13/00* (2006.01)
*G06F 13/42* (2006.01)

(52) U.S. Cl. ............................. 710/52; 710/35; 710/106
(58) Field of Classification Search .................. None
See application file for complete search history.

(56) References Cited

U.S. PATENT DOCUMENTS

| | | | |
|---|---|---|---|
| 6,757,755 B2 * | 6/2004 | Askar et al. ...................... | 710/52 |
| 7,443,869 B2 * | 10/2008 | Solomon et al. ................. | 710/52 |
| 2005/0013319 A1 * | 1/2005 | Kenkare .......................... | 710/305 |
| 2006/0153078 A1 | 7/2006 | Yasui | |
| 2006/0173986 A1 | 8/2006 | Ikeda et al. | |
| 2006/0224936 A1 | 10/2006 | Takamatsuya | |
| 2007/0088900 A1 | 4/2007 | Moritoki et al. | |
| 2007/0250649 A1 * | 10/2007 | Hickey et al. ................... | 710/62 |
| 2008/0313678 A1 * | 12/2008 | Ryu et al. ......................... | 725/62 |
| 2009/0037616 A1 * | 2/2009 | Brownell et al. ............... | 710/29 |

FOREIGN PATENT DOCUMENTS

JP 2006-189937 7/2006
(Continued)

OTHER PUBLICATIONS

Eugin Hyun; Kwang-Su Seong; , "The design of PCI Express for future communication platform," Intelligent Signal Processing and Communication Systems, 2004. ISPACS 2004. Proceedings of 2004 International Symposium on , vol., No., pp. 734-739, Nov. 18-19, 2004 doi: 10.1109/ISPACS.2004.1439156.*

(Continued)

*Primary Examiner* — Tariq Hafiz
*Assistant Examiner* — Dayton Lewis-Taylor
(74) *Attorney, Agent, or Firm* — Brundidge & Stanger, P.C.

(57) ABSTRACT

To provide a transceiving technology that controls the mounting area of a circuit pertaining to transmission and/or reception and where the utilization efficiency of a buffer is improved. In a transmission side circuit, there are disposed a transmission side first circuit component that generates a first packet that follows a request and a transmission side second circuit component that is a lower-level circuit component of the transmission side first circuit component, includes a transmission buffer and temporarily stores in the transmission buffer, and transmits, a second packet that includes the first packet. The second packet includes a second header portion and a second data portion. In the second data portion that the second packet that is transmitted from the transmission side second circuit component includes, there is included the first packet, and in the second header portion, there is included a predetermined value as a parameter value that represents the type of the second packet. The predetermined value is a value that represents a predetermined one second packet type of plural second packet types.

11 Claims, 16 Drawing Sheets

FOREIGN PATENT DOCUMENTS

| | | |
|---|---|---|
| JP | 2006-195871 | 7/2006 |
| JP | 2006-285378 | 10/2006 |
| JP | 2007-109141 | 4/2007 |

OTHER PUBLICATIONS

Eugin Hyun; Kwang-Su Seong; , "The effective buffer architecture for data link layer of PCI express," Information Technology: Coding and Computing, 2004. Proceedings. ITCC 2004. International Conference on , vol. 1, No., pp. 809-813 vol. 1, Apr. 5-7, 2004 doi: 10.1109/ITCC.2004.1286569.*

R. Buruk, et al "PCI Express System Architecture", MindShare, Inc., Jun. 30, 2003, pp. 160-166.

* cited by examiner

FIG. 10
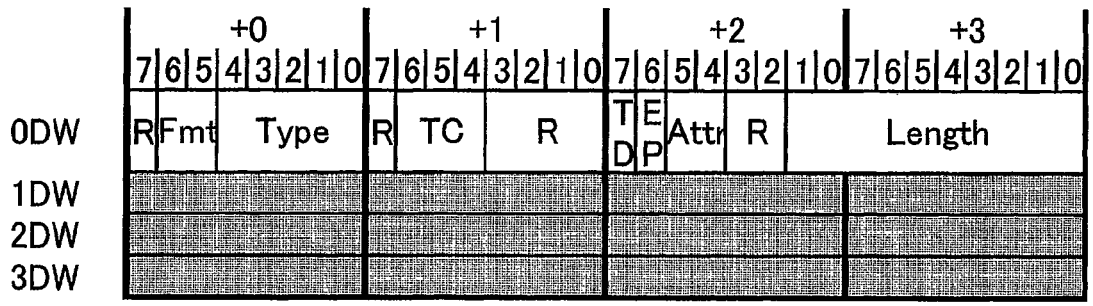
FIG. 11
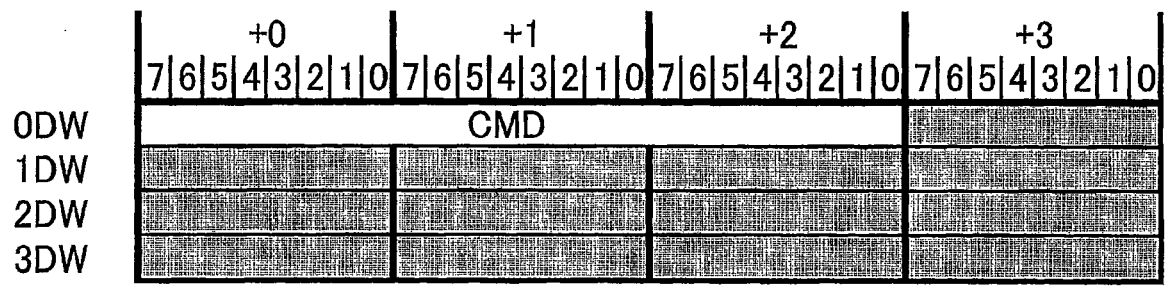
FIG. 12
| HSN-Posted | REGISTER WRITE |
|---|---|
| HSN-NonPosted | DATA READ |
| | DATA WRITE |
| | REGISTER READ |
| HSN-Completion | REPLY OF HSN-NON-POSTED PACKET |

STORAGE SYSTEM DISPOSED WITH PLURAL INTEGRATED CIRCUITS

CROSS REFERENCES TO RELATED APPLICATIONS

This application relates to and claims priority from Japanese Patent Application No. 2008-215003, filed on Aug. 25, 2008, the entire disclosure of which is incorporated herein by reference.

BACKGROUND OF THE INVENTION

1. Field of the Invention

The present invention relates to a storage system disposed with plural integrated circuits.

2. Description of the Related Art

A storage system is disposed with plural storage devices and a controller that accesses at least one storage device of the plural storage devices in accordance with an access request from a higher-level device. The controller is, for example, disposed with a cache memory that temporarily stores data that are to be written in the storage devices or are to be read from the storage devices, a microprocessor that controls the reading and writing of data with respect to the storage devices, an interface circuit (a higher-level adapter) with the higher-level device (e.g., a host computer or another storage system), an interface circuit (a lower-level adapter) with the storage devices, an interface circuit (a CM adapter) with respect to the cache memory, an interface circuit (an MP adapter) with respect to the microprocessor), and a switch circuit that is connected to the higher-level adapter, the lower-level adapter, the CM adapter and the MP adapter. Each of the aforementioned adapters and the switch circuit is an LSI (Large Scale Integration), and transmission and reception are performed between the LSIs. As the interface of transmission and reception between the LSIs, PCI-Express is employed.

In the LSIs, for example, there are disposed a transmission LSI component 101 shown in FIG. 1 and a reception LSI component 201 shown in FIG. 2.

In the transmission LSI component 101 (receiving LSI component 201), there are disposed a user logic 102 (202) and a PCI-Express interface circuit component 106 (206) that exists on a lower level. In the PCI-Express interface circuit component 106 (206), there are disposed plural logic circuits. Those logic circuits are, from a higher-level side to a lower-level side, a TL transmission logic 103 (TL reception logic 203) that performs processing by a TL (Transaction Layer), a DLL transmission logic 104 (DLL reception logic 204) that performs processing by a DLL (Data Link Layer), and a PL transmission logic 105 (PL reception logic 205) that performs processing by a PL (Physical Layer).

In PCI-Express, as packets handled by a TL (below, TLPs (Transaction Layer Packets), there are Posted-TLP that is a TLP of a type (Posted) that does not require a reply, Non-Posted TLP that is a TLP of a type (Non-Posted) that requires a reply, and Completion-TLP that is a TLP of a type (Completion) that represents a reply.

In the TL transmission logic 103 (TL reception logic 203), there are disposed three transmission buffers 1032, 1033 and 1034 (three reception buffers 2023, 2033 and 2034) that correspond to the three TLP types of Posted, Non-Posted and Completion, and a demultiplexer (below, DEMUX) 1031 (2031) is disposed in a higher level than those. Further, in the TL transmission logic 103, an MUX 1035 is disposed in a lower level of the three transmission buffers 1032, 1033 and 1034.

In the transmission source LSI, the TL transmission logic 103 performs the following (3-1) to (3-3):

(3-1) when the TLP that is to be transmitted is a Posted-TLP, the TL transmission logic 103 temporarily stores that TLP in the Posted transmission buffer 1032 and transmits the TLP from that buffer 1032 (S302, S303 and S306 in FIG. 3);

(3-2) when the TLP that is to be transmitted is a Non-Posted TLP, the TL transmission logic 103 temporarily stores that TLP in the Non-Posted transmission buffer 1033 and transmits the TLP from that buffer 1033 (S302, S304 and S306 in FIG. 3);

(3-3) when the TLP that is to be transmitted is a Completion-TLP, the TL transmission logic 103 temporarily stores that TLP in the Completion transmission buffer 1034 and transmits the TLP from that buffer 1034 (S302, S305 and S306 in FIG. 3).

In the reception source LSI, the TL reception logic 203 performs the following (4-1) to (4-3):

(4-1) when the TLP that has been received is a Posted-TLP, the TL reception logic 203 temporarily stores that TLP in the Posted reception buffer 2032 (S401, S402 and S403 in FIG. 4);

(4-2) when the TLP that has been received is a Non-Posted TLP, the TL reception logic 203 temporarily stores that TLP in the Non-Posted reception buffer 2033 (S401, S402 and S404 in FIG. 4);

(4-3) when the TLP that has been received is a Completion-TLP, the TL reception logic 203 temporarily stores that TLP in the Completion reception buffer 2034 (S401, S402 and S405 in FIG. 4).

As a technology that relates to transmission and reception by PCI-Express, the technology disclosed in JP-A-2006-189937, for example, is known. According to JP-A-2006-189937, buffer areas that correspond to the TLP types are allocated at a necessary timing from the buffers.

SUMMARY OF THE INVENTION

As shown in FIG. 1 and FIG. 2, when plural buffers that respectively correspond to the plural TLP types are prepared, there are instances where the utilization efficiency of the buffers becomes bad. For example, as shown in FIG. 18, when the buffer that corresponds to the Non-Posted-TLPs is completely full, no more Non-Posted-TLPs can be stored even when there is an empty area in the buffers that correspond to Posted or Completion.

Further, in order to control a situation where, even when any of the Posted-TLP, the Non-Posted-TLP and the Completion-TLP is transferred at a limit performance (transfer speed) of PCI-Express, a TLP cannot be stored in the buffers and performance deteriorates, it is necessary to make the capacity of each of the buffers that corresponds to Posted-TLP buffer capacity that where Posted-TLP can be processed without delay even when it is exclusively transferred at the limit performance, and Non-Posted-TLP buffer capacity that where Non-Posted-TLP can be processed without delay even when it is exclusively transferred at the limit performance, and Completion-TLP buffer capacity that where Completion-TLP can be processed without delay even when it is exclusively transferred at the limit performance. Specifically, for example, as shown in FIG. 19, it is necessary to make the buffer capacity into a buffer capacity where processing is performed without delay even when any of the Posted-TLP, the Non-Posted-TLP and the Completion-TLP is transferred at the limit performance of PCI-Express (in FIG. 19, the three cells arranged vertically respectively correspond to a buffer capacity where processing is performed without delay even when each type of TLP is transferred at the limit performance of PCI-Express). However, when the capacity of each of the buffers is made into the above-described capacity, the logic gate scale (mounting area) of the PCI-Express interface circuit component ends up becoming large. This is a problem particularly in a storage system. The reason is because, in a storage system, it is desired that the paths between the LSIs (PCI-Express lanes) be made redundant, and for this reason, plural PCI-Express interface circuit components become necessary for each of the adapters and the switch circuit, but as described above, when the mounting area of the PCI-Express interface circuit components ends up becoming large, the number of the PCI-Express interface circuit components that are installable on the adapters and the switch circuit ends up becoming small, and therefore making the paths between the LSIs redundant can become difficult.

However, when the buffers are made into a large capacity, both the problem that the logic gate scale of the PCI-Express interface circuit components ends up becoming large and the problem that utilization efficiency is bad, where useless areas that are not utilized are present in the buffers even when a certain type of TLP flows at the limit performance of PCI-Express, arise.

The above problems are problems that can exist even in transmission and reception utilizing an interface other than PCI-Express.

Further, when the technology disclosed in JP-A-2006-189937 is used, one reception buffer can be shared by the three types of TLPs, so the buffer can be efficiently utilized, but this requires changing the algorithms inside the TL (Transaction Layer) and the DLL (Data Link Layer). When a versatile interface such as PCI-Express is mounted as hardware, it is common to use hard IP (Intellectual Property) and versatile chips, but the logic inside these ordinarily cannot be changed. Thus, in order to use the technology disclosed in JP-A-2006-189937, a method such as developing on one's own in relation to TL and DLL using hard IP that operates by a PL (Physical Layer) must be taken, and the problem that the development amount of the interface component ends up becoming enormous arises.

Consequently, it is an object of the present invention to provide a transceiving technology that controls the mounting area of a circuit pertaining to transmission and/or reception and where the utilization efficiency of a buffer is improved.

Further, it is another object of the present invention to achieve the above-described object without changing the algorithms of layers (e.g., the aforementioned PL, DLL and TL) inside the interface component.

In a transmission side circuit, there are disposed a transmission side first circuit component that generates a first packet that follows a request and a transmission side second circuit component that is a lower-level circuit component of the transmission side first circuit component, includes a transmission buffer and temporarily stores in a transmission buffer, and transmits, a second packet that includes the first packet. In the first packet, there is included a parameter value that represents, of plural first packet types that respectively correspond to plural second packet types that are supported by an interface of communication that the transmission side second circuit component performs, a first packet type that follows the request. The second packet includes a second header portion and a second data portion. In the second data portion that the second packet that is transmitted from the transmission side second circuit component includes, there is included the first packet, and in the second header portion, there is included a predetermined value as a parameter value that represents the type of the second packet. The predetermined value is a value that represents a predetermined one second packet type of the plural second packet types. The second packet may be generated by either of the transmission side first circuit component and the transmission side second circuit component.

BRIEF DESCRIPTION OF THE DRAWINGS

FIG. 10 is a configural diagram of a TLP header portion;

FIG. 11 is a configural diagram of an HSN header portion;

FIG. 12 shows the relationship between HSNP types and CMD definition information;

DETAILED DESCRIPTION OF THE INVENTION

Below, an embodiment of the present invention will be described with reference to the drawings.

Figure 5A:
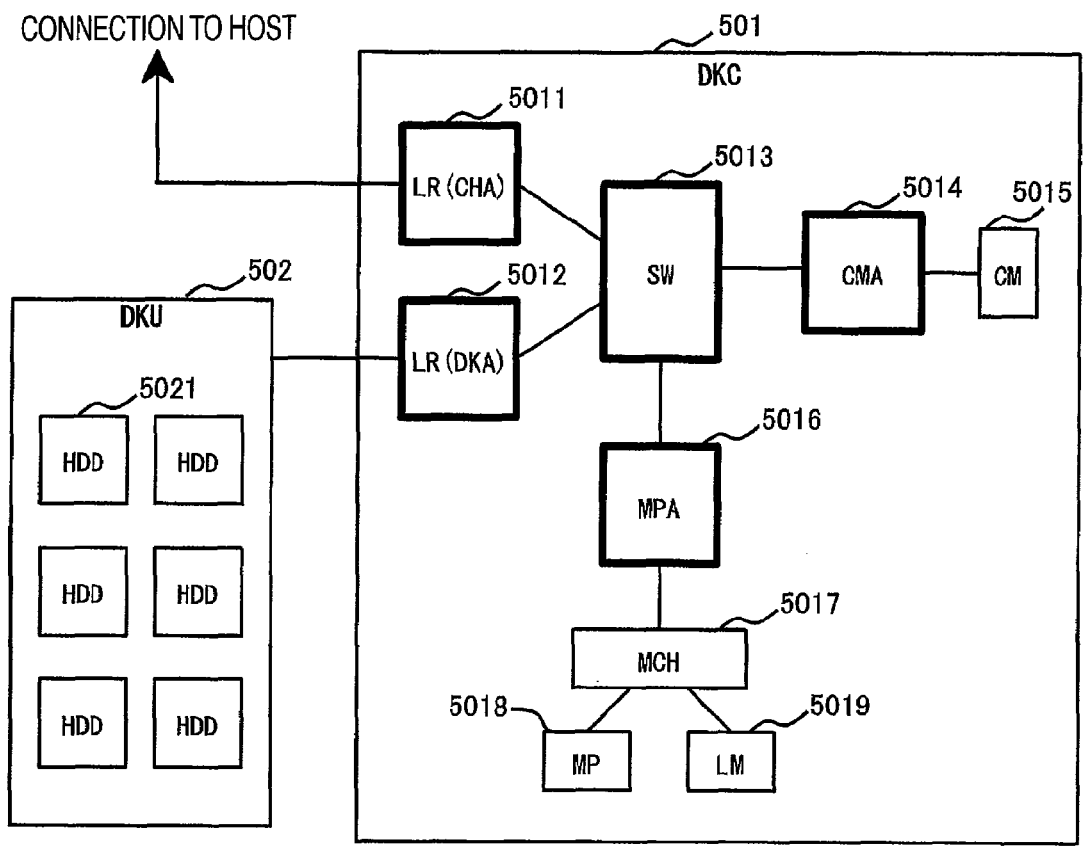
FIG. 5A shows the configuration of a storage system pertaining to an embodiment of the present invention.

FIG. 5A shows the configuration of a storage system pertaining to the embodiment of the present invention.

The storage system is a disk array device such as a RAID (Redundant Array of Independent Disks), for example. The storage system is, for example, disposed with a disk controller (below, DKC) 501 that controls processing that the storage system performs and a disk unit (below, DKU) 502 that includes plural hard disk drives (HDDs) 5021. Instead of the HDDs 5021, another type of storage device (e.g., a flash memory device) may also be disposed.

The DKC 501 is disposed with LRs (Local Routers) 5011 and 5012, an SW (Switch) 5013, a CMA (Cache Memory Adapter) 5014, a CM (Cache Memory) 5015, an MPA (Micro Processor Adapter) 5016, an MCH (Memory Controller Hub) 5017, an MP (Micro Processor) 5018 and an LM (Local Memory) 5019.

"LR" is an abbreviation for local routers, and the local routers are LSIs that controls-input/output (IO). In the LRs, there are a CHA (channel adapter) 5011 that is a higher-level LR that is connected to a host and a DKA (disk adapter) 5012 that is a lower-level LR that is connected to the HDDs 5021 inside the DKU 502.

The SW 5013 is an LSI that is connected by an HSN (Hierarchical Star Net) to the CHA 5011, the DKA 5012, the CMA 5014 and the MPA 5016. The SW 5013 controls the transfer of a TLP (Transaction Layer Packet) from the LSIs 5011, 5012, 5014 and 5016.

The CMA 5014 is an LSI that performs control of the CM 5015.

The CM 5015 is a memory that temporarily stores data that are received from the host and written in the HDDs 5021 or data that are read from the HDDs 5021 and transmitted to the host.

The MPA 5016 is an LSI that is connected by PCI-Express to the MCH 5017 and generates a TLP on the basis of a packet from the MCH 5017.

The MCH 5017 is chip set that controls communication between the MPA 5016, the MP 5017 and the LM 5019.

The MP 5018 controls IO commands (a write command or a read command) from the host.

The LM 5019 is a memory that stores data and the like that the MP 5018 references.

Figure 5B:
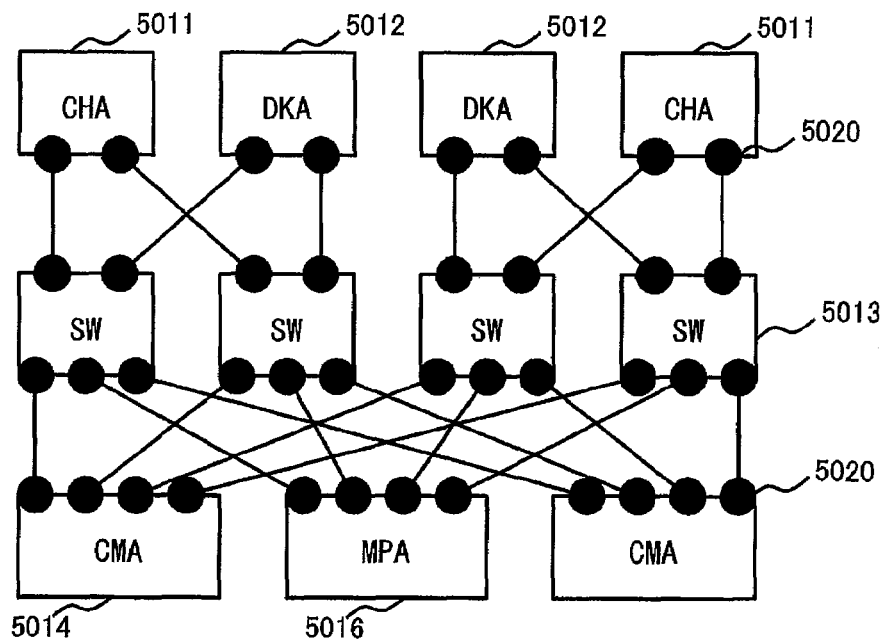
FIG. 5B is a wire connection diagram of an LSI.

At least one of the aforementioned configural elements 5011 to 5019 exists plurally. Further, of the aforementioned configural elements 5011 to 5019, the LSIs 5011, 5012, 5013, 5014 and 5016 indicated by fat lines in FIG. 5A are improved LSIs. Paths that interconnect those LSIs 5011, 5012, 5013, 5014 and 5016 are, as shown in FIG. 5B, made redundant, and therefore those LSIs 5011, 5012, 5013, 5014 and 5016 are disposed with plural PCI-Express interface circuits 5020. Each of the LSIs 5011, 5012, 5013, 5014 and 5016 is disposed with a set (below, LSI component set) comprising a transmission side LSI component 601 shown in FIG. 6 and a reception side LSI component 701 shown in FIG. 7. The PCI-Express interface circuits 5020 are configured by a PCI-Express interface circuit component 606 shown in FIG. 6 and a PCI-Interface interface circuit component 706 shown in FIG. 7. Plural LSI component sets may also exist in each of the LSIs 5011, 5012, 5013, 5014 and 5016, or, a user logic 602 (702) may also be shared with respect to the plural PCI-Express interface circuits 5020.

Figure 6:
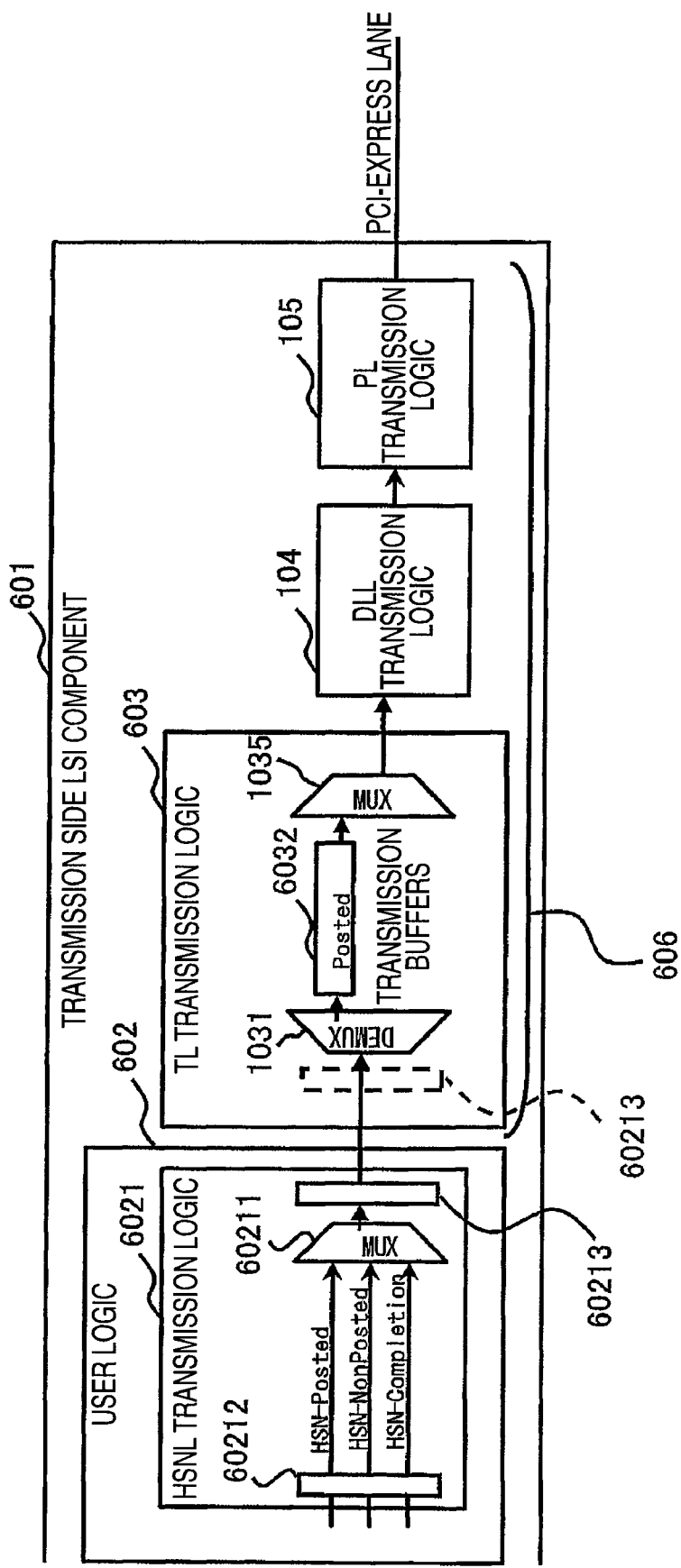
FIG. 6 is a configural diagram of a transmission side LSI component pertaining to the embodiment of the present invention.

FIG. 6 is a configural diagram of the transmission side LSI component 601.

In the transmission side LSI component 601, there are disposed the user logic 602 and the PCI-Express interface circuit component 606 that exists on a lower level. In the PCI-Express interface circuit component 606, there are disposed plural logic circuits. Those logic circuits are, from a higher-level side to a lower-level side, a TL transmission logic 603 that performs processing by a TL (Transaction Layer), a DLL transmission logic 104 that performs processing by a DLL (Data Link Layer), and a PL transmission logic 105 that performs processing by a PL (Physical Layer). The DLL transmission logic 104 and the PL transmission logic 105 are the same as those shown in FIG. 1, and the user logic 602 and the TL transmission logic 603 are different from the user logic 102 and the TL transmission logic 103 shown in FIG. 1.

The user logic 602 is a logic circuit and includes an HSNL (Hierarchical Star Net Layer) transmission logic 6021. The HSNL is a higher-level layer of a TL, such as an application layer, for example. The HSNL transmission logic 6021 includes an HSNP generation component 60212 that generates HSN packets (below, HSNPs), a multiplexer (MUX) 60211 that receives, and outputs, any of three types of HSNPs from the HSNP generation component 60212, and a TLP generation component 60213 that generates a TLP (Transaction Layer Packet) that includes the HSNP that has been outputted. The TLP generation component 60213 may exist anywhere as long as it is further downstream than the HSNP generation component 60212 and further upstream than a Posted transmission buffer 6032. Consequently, for example, as indicated by the dotted line in FIG. 6, the TLP generation component 60213 may also exist in the TL transmission logic 603.

In this embodiment, only a Posted-TLP is generated by the TLP generation component 60213. For this reason, in the TL transmission logic 603, the transmission buffer that is intervened between an upstream side DEMUX 1031 and a downstream side MUX 1035 is only the Posted transmission buffer 6032, and there are no Non-Posted transmission buffer and Completion transmission buffer. The capacity of the Posted transmission buffer 6032 is a capacity where processing is performed without delay even when a Posted-TLP is transferred at a limit performance (e.g., 2.5 Gps) of PCI-Express.

It will be noted that, as described above, in order to render unnecessary two transmission buffers (or buffer areas) of the three transmission buffers (or buffer areas) that correspond to the three types, it is conceivable for only the Non-Posted-TLP or only the Completion-TLP to be generated instead of only the Posted-TLP being generated, but it is thought that it is preferable for only the Posted-TLP to be generated for the following reasons (6-1) and (6-2):

(6-1) Completion is a reply with respect to a Non-Posted-TLP, so it is not generated when there is no Non-Posted TLP;

(6-2) Non-Posted is a type that requires a reply, so when a Non-Posted-TLP reaches a transmission destination, the transmission destination ends up returning a Completion-TLP, but there is also communication that does not require such a reply.

Figure 7:
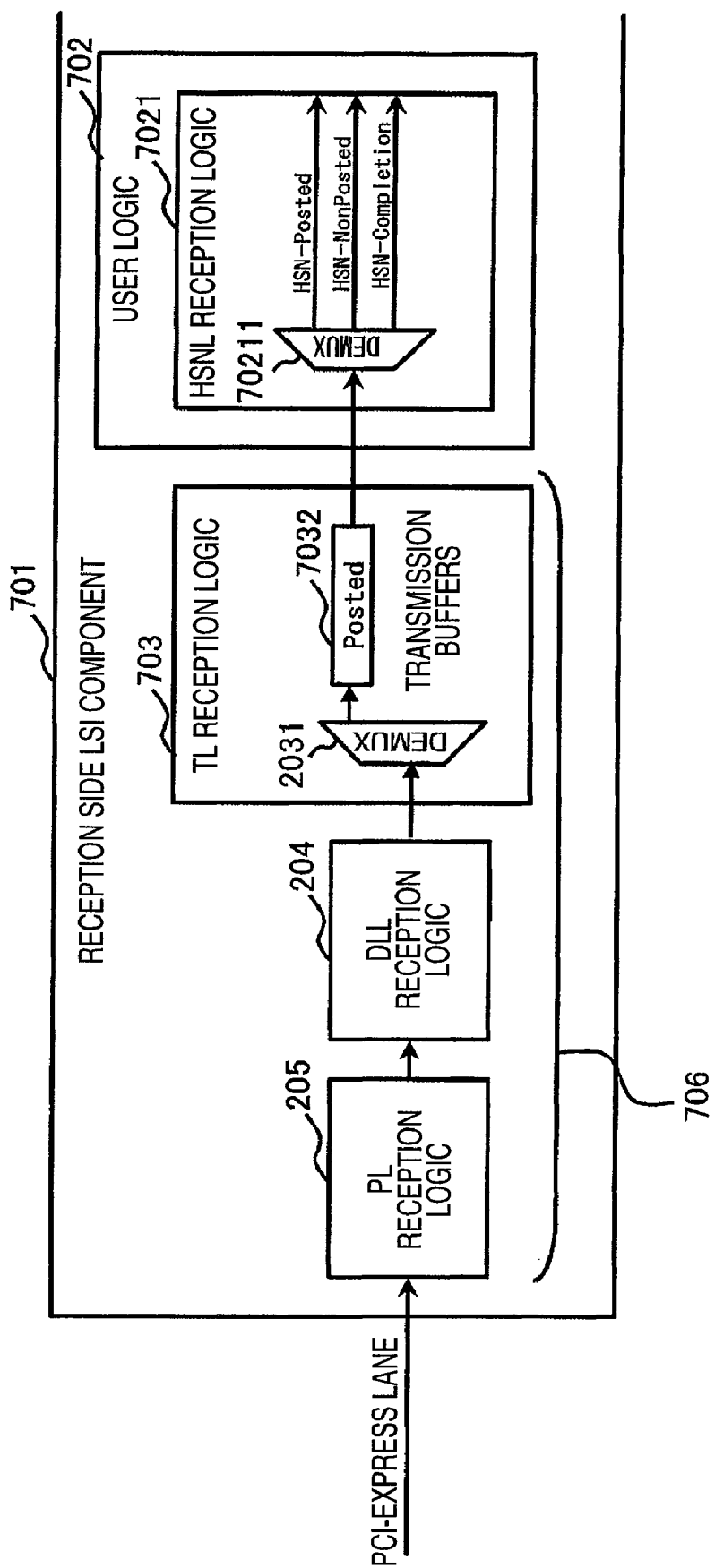
FIG. 7 is a configural diagram of a reception side LSI component pertaining to the embodiment of the present invention.

FIG. 7 is a configural diagram of the reception side LSI component 701.

A user logic 702 and a PCI-Express interface circuit component 706 that exists on a lower level are disposed. In the PCI-Express interface circuit component 706, there are disposed plural logic circuits. Those logic circuits are, from a higher-level side to a lower-level side, a TL reception logic 703 that performs processing by a TL, a DLL reception logic 204 that performs processing by a DLL, and a PL reception logic 205 that performs processing by a PL. The DLL reception logic 204 and the PL reception logic 205 are the same as those shown in FIG. 2, and the user logic 702 and the TL reception logic 703 are different from the user logic 202 and the TL reception logic 203 shown in FIG. 2.

The user logic 702 is a logic circuit and includes an HSNL reception logic 7021. The HSNL reception logic 7021 includes a DEMUX 70211 that receives, and outputs, any of the three types of HSNPs, and the HSNL reception logic 7021 processes the HSNP that has been outputted.

Figure 20:
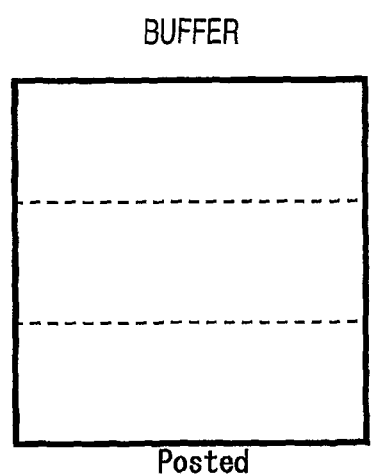
FIG. 20 shows a concept of the capacity of a buffer for ensuring that processing is performed without delay even when a TLP is received at a limit performance of PCI-Express in the embodiment of the present invention.

In this embodiment, only the Posted-TLP is received. For this reason, in the TL reception logic 703, the reception buffer that exists downstream of a DEMUX 2031 is only a Posted reception buffer 7032, and there are no Non-Posted reception buffer and Completion reception buffer. The capacity of the Posted reception buffer 7032 is, for example, as shown in FIG. 20, a capacity where processing is performed without delay even when a Posted-TLP is transferred at a limit performance (e.g., 2.5 Gps) of PCI-Express.

According to the above description, in regard to both the transmission buffer and the reception buffer, there are only buffers that correspond to Posted, and there are no buffers (or buffer areas) that correspond to Non-Posted and Completion. Further, therefore, it suffices for a buffer capacity where processing is performed without delay even when transferred at a limit performance (e.g., 2.5 Gps) of PCI-Express to be ensured only in regard to buffers that correspond to Posted. For this reason, there is no worsening of the utilization efficiency of the buffers, and the mounting area (logic gate scale) of the PCI-Express interface circuits 5020 (see FIG. 5B) can be controlled.

Further, according to the above description, the algorithms of the layers (e.g., the aforementioned PL, DLL and TL) inside the PCI-Express interface circuit components 606 and 706 do not have to be substantially changed. For this reason, versatile hard IP and the like inside the PCI-Express interface circuit components 606 and 706 can be used as is, so the development amount is controlled and the utilization efficiency of the buffers can be improved.

Below, the present embodiment will be described in greater detail.

Figure 17:
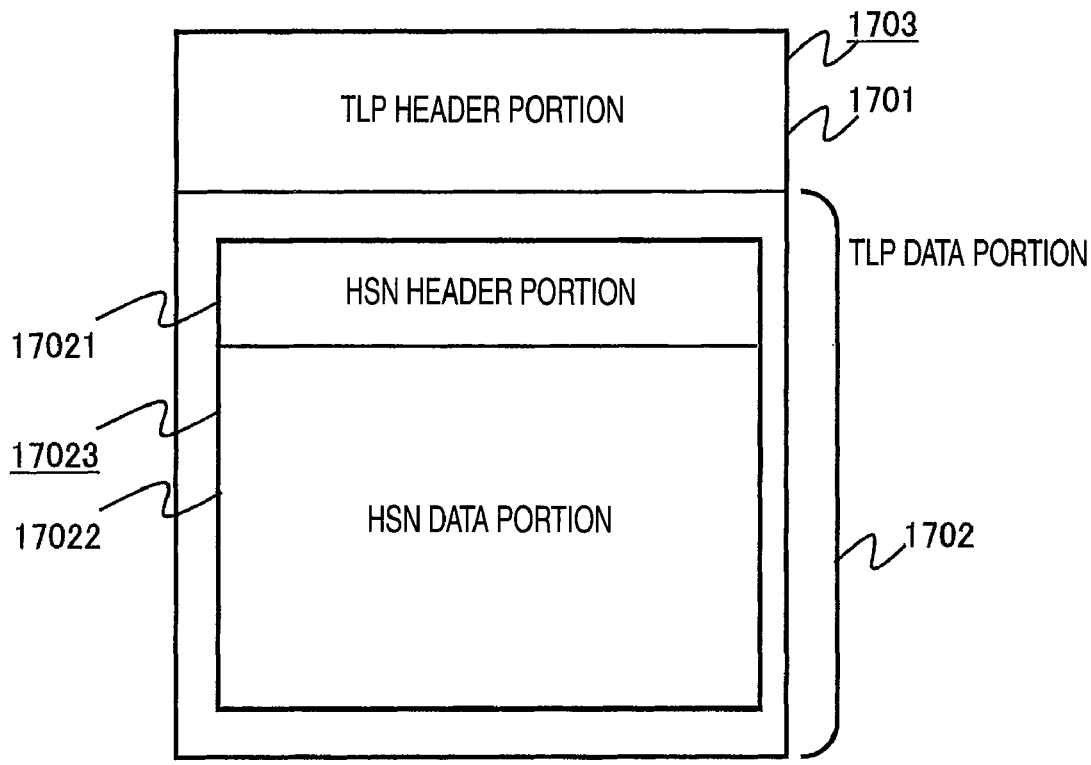
FIG. 17 is a configural diagram of a TLP.
Figure 18:
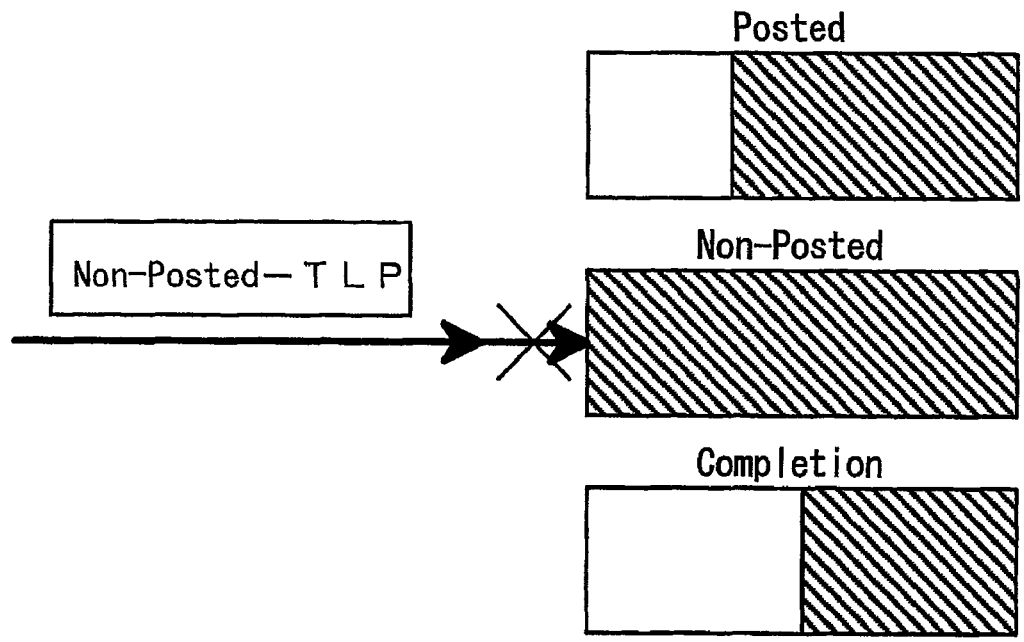
FIG. 18 is a diagram showing an example where the utilization efficiency of a buffer becomes bad.
Figure 19:
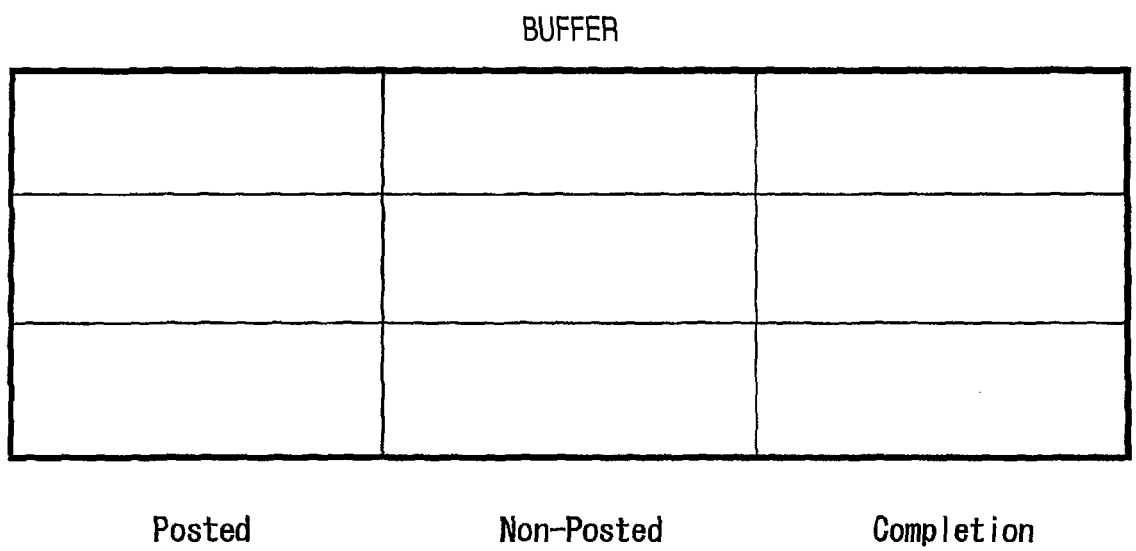
FIG. 19 shows a concept of the capacity of a buffer for ensuring that processing is performed without delay even when a TLP of whatever TLP type is received at a limit performance of PCI-Express.

FIG. 17 is a configural diagram of a TLP.

A TLP 1703 includes a TLP header portion 1701 and a TLP data portion 1702. An HSNP 17023 is set in the TLP data portion 1702.

The HSNP 17023 includes an HSN header portion 17021 and an HSN data portion 17022. In the HSN data portion 17022 there are set, for example, control information (e.g., information representing the content of a command with respect to the transmission destination LSI of the TLP 1703) that is to be written in a register that the transmission destination LSI of the TLP 1703 includes and data (below, user data) that are to be read and written with respect to the HDDs 5021 in accordance with an IO command from the host.

FIG. 10 is a configural diagram of the TLP header portion 1701.

The TLP header portion 1701 is, for example, configured by 4 bytes×4 words=16 bytes. A value that represents the TLP type is set in the Fmt field of the second to third bits of the first word (ODW) and in the Type field of the fourth to eighth bits. As the TLP types, as has already been described, there are the three types of Posted, Non-Posted and Completion, but the TLP that is exchanged in the present embodiment is just a Posted-TLP. Specifically, the value that is set in the Fmt field and in the Type field is a fixed value, and a value that represents Posted is set. Further, information representing the transmission destination of the TLP, for example, is set in the TLP header portion 1701.

FIG. 11 is a configural diagram of the HSN header portion 17021.

The HSN header portion 17021 is positioned at the head of the TLP data portion 1702 and therefore continues from the TLP header portion 1701. The HSN header portion 17021 is, for example, also configured by 4 bytes×4 words=16 bytes. The higher-level three bytes of the first word become a CMD field.

A value that represents the HSNP type is set in the higher-level 4 bits of the CMD field. As the HSNP types, there are HSN-Posted, HSN-Non-Posted and HSN-Completion that respectively correspond to Posted, Non-Posted and Completion that are supported by PCI-Express. HSN-Posted is a type that does not require a reply. HSN-Non-Posted is a type that requires a reply. HSN-Completion is a type that means a reply.

Figure 8:
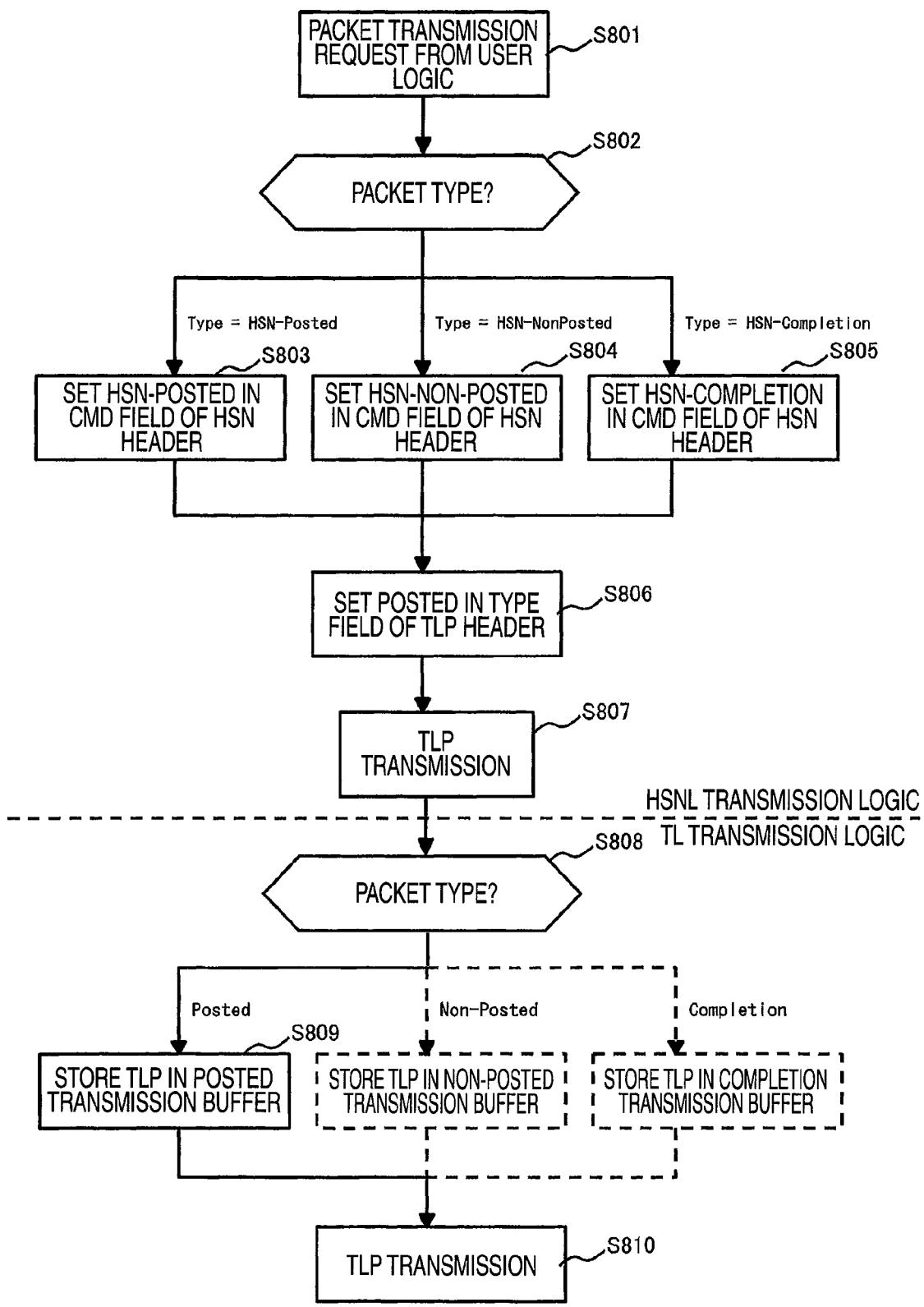
FIG. 8 shows a flow of processing that is performed by the transmission side LSI component of FIG. 6.

FIG. 8 shows a flow of processing that is performed by the transmission side LSI component 601.

The HSNP generation component 60212 inside the HSNL transmission logic 6021 receives a packet transmission request from a higher-level module (a higher-level module than the HSNP generation component 60212) inside the user logic 602, for example (S801).

The HSNP generation component 60212 generates an HSNP where a value that represents the HSNP type that corresponds to the type that has been requested is set in the CMD field of the HSN header portion 17021 (S802, S803, S804 and S805). In the HSN data portion 17022 inside that HSNP, for example, there is set the aforementioned control information or user data.

Next, the TLP generation component 60213 generates a Posted-TLP regardless of the HSNP type of the HSNP that has been generated (S806). Specifically, the TLP generation component 60213 generates a Posted-TLP where the HSNP that has been generated is set in the TLP data portion 1702 and where a value that represents Posted is set inside the TLP header portion 1703. The Posted-TLP that has been generated is transmitted from the HSNL transmission logic 6021 (S807). In the TLP header portion 1703 of the Posted-TLP, transmission destination information (e.g., an LSI number) that represents the transmission destination of this Posted-TLP is set by the TLP generation component 60213.

In the TL transmission logic 603 that has received the Posted-TLP from the HSNL transmission logic 6021, the DEMUX 1031 distinguishes that the TLP that has been received is a Posted-TLP (S808), and that Posted-TLP is stored in the Posted transmission buffer 6032 (S809). The Posted-TLP that has been stored in the Posted transmission buffer 6032 is transmitted from the TL transmission logic 3603 (S810).

The Posted-TLP that has been transmitted from the TL transmission logic 603 flows through the DLL transmission logic 104 and the PL transmission logic 105 and is eventually outputted to the outside (PCI-Express lane).

Figure 1:
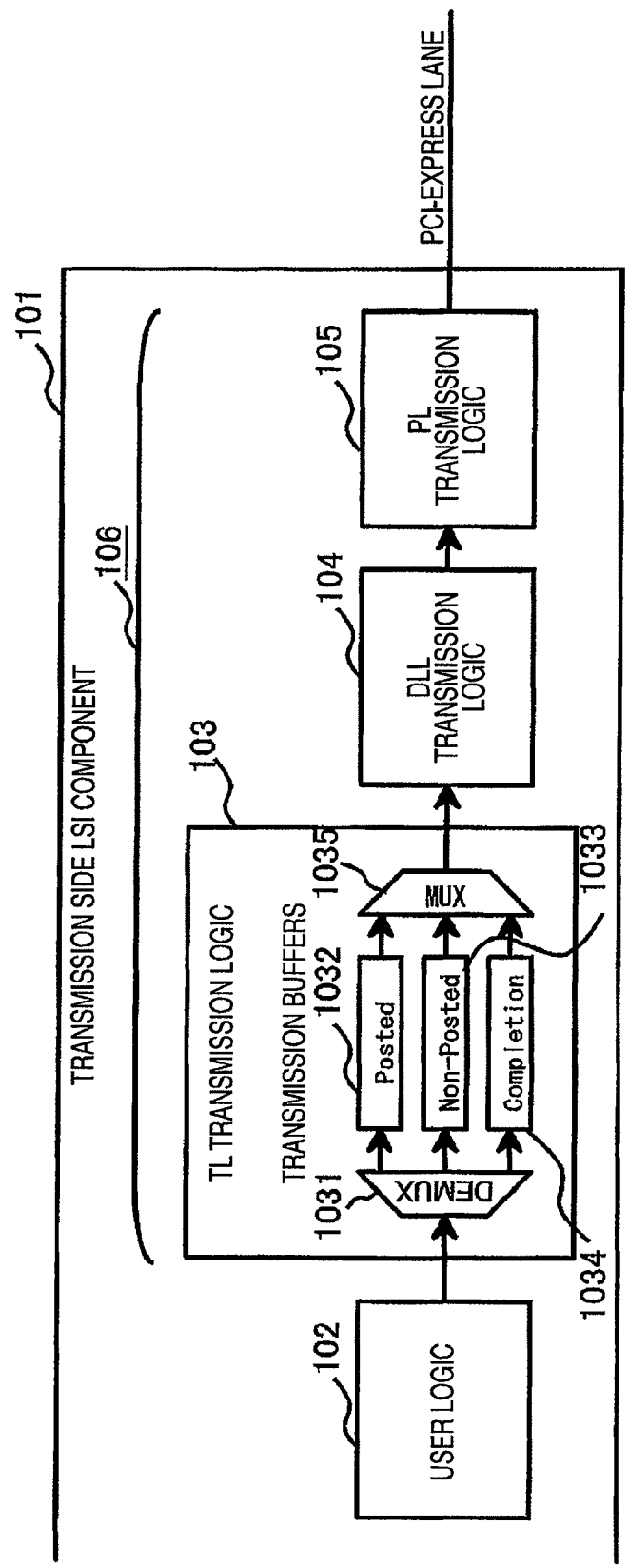
FIG. 1 is a configural diagram of a conventional transmission side LSI component.
Figure 3:
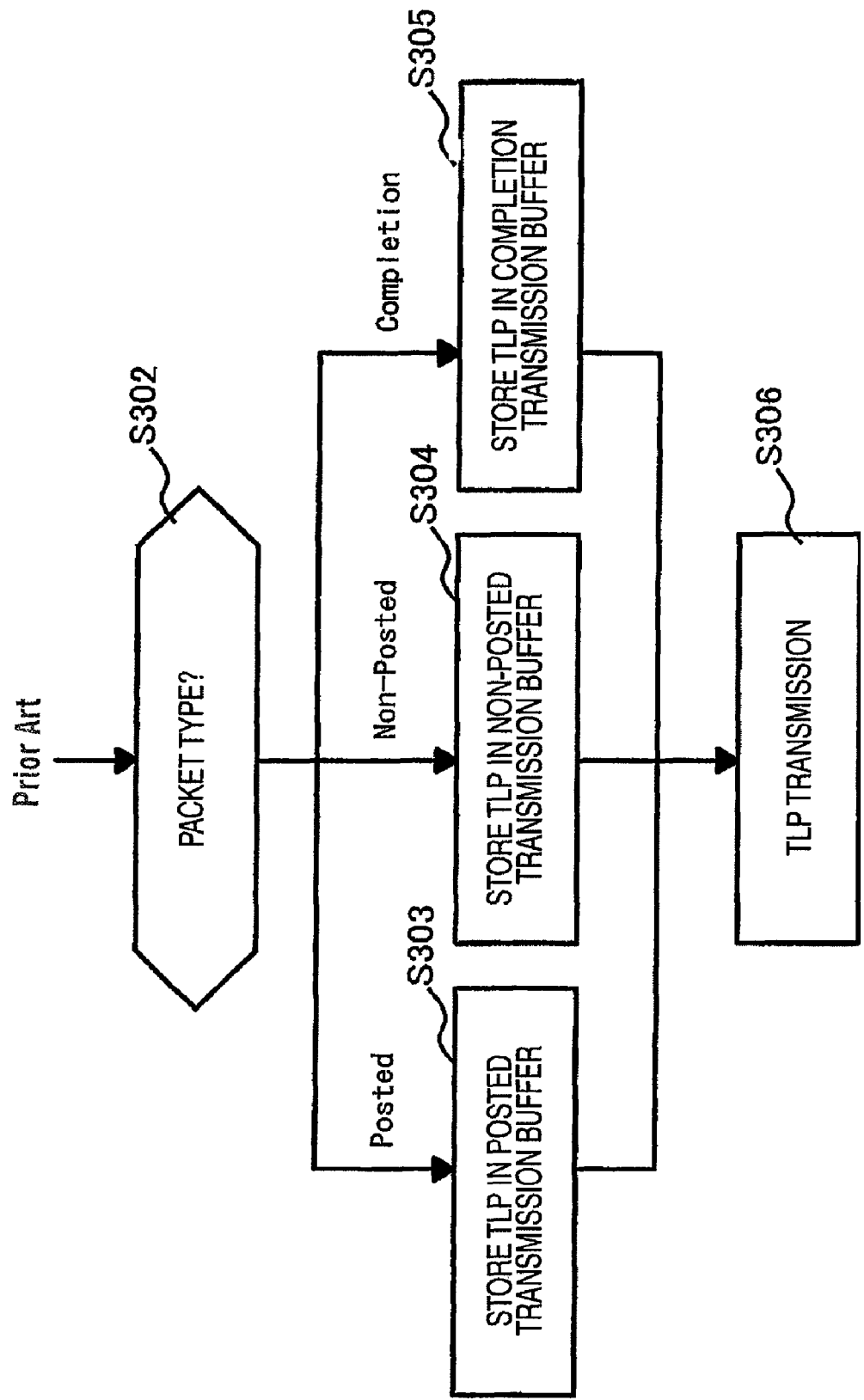
FIG. 3 shows a flow of processing that is performed by the conventional transmission side LSI component.

When the TL transmission logic 603 shown in FIG. 6 and the TL transmission logic 103 shown in FIG. 1 are compared and when the flow shown in FIG. 8 and the flow shown in FIG. 3 are compared, it can be expected that the TL transmission logic 603 is realized even without changing the logic itself of the TL transmission logic 103 (in other words, by excluding the Non-Posted transmission buffer and the Completion transmission buffer). It will be noted that, in FIG. 6, it is alright even if there are no DEMUX 1031 and MUX 1035 in the TL transmission logic 603. When there are no DEMUX 1031 and MUX 1035, it can be expected that the mounting area of the PCI-Express interface circuit component 606 is controlled even more.

Figure 9:
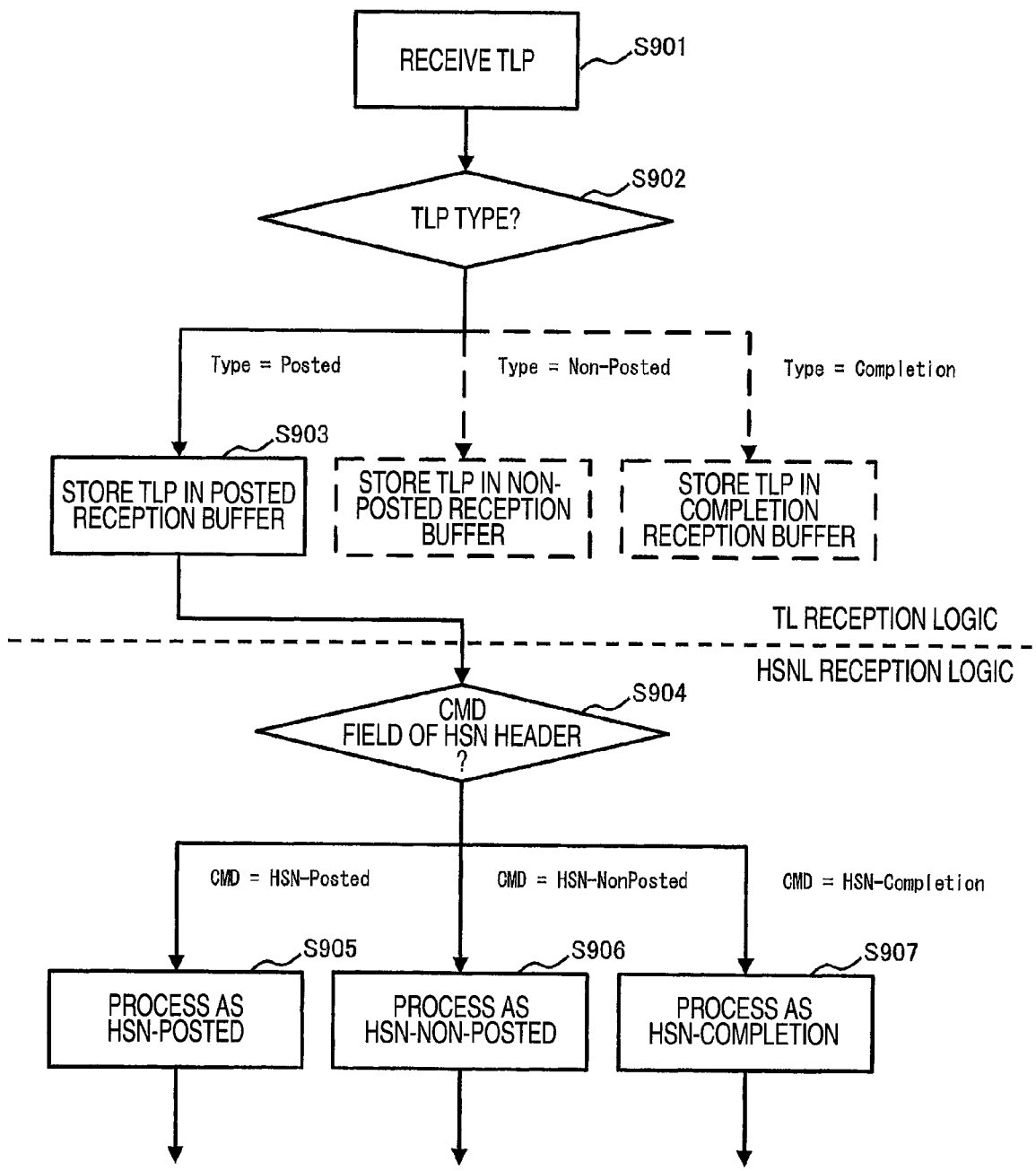
FIG. 9 shows a flow of processing that is performed by the reception side LSI component of FIG. 7.

FIG. 9 shows a flow of processing that is performed by the reception side LSI component 701.

The Posted-TLP that has been transmitted from the transmission side LSI component 601 inside a certain LSI (e.g., the CHA 5011) is received via the SW 5013 by the reception side LSI component 701 inside the transmission destination LSI (e.g., the CMA 5014) of that Posted-TLP. The Posted-TLP that has been received is received by the TL reception logic 703 via the PL reception logic 205 and the DLL reception logic 204 (S901).

The DEMUX 2031 inside the TL reception logic 703 distinguishes that the TLP that has been received is a Posted-TLP (S902), and that Posted-TLP is stored in the Posted reception buffer 7032 (S903). Thereafter, the HSNL reception logic 7021 is notified that the Posted-TLP has been received (e.g., the Posted-TLP that has been stored in the Posted reception buffer 7032 is transmitted to the HSNL reception logic 7021).

In the HSNL transmission logic 7021, the CMD field inside the HSNP that is included in the TLP data portion 1702 of that Posted-TLP is interpreted (S904), and that HSNP is processed on the basis of the result of that interpretation. Specifically, for example, when a value that represents HSN-Posted is set in that CMD field, processing where a reply is not returned is executed (S905), and when a value that represents HSN-Non-Posted is set, processing pertaining to the fact that the HSNP that includes HSN-Completion is to be returned from the transmission side LSI component 601 of the above-described transmission destination LSI is executed (S906), and when a value that represents HSN-Completion is set, processing as a reply is executed (S907).

Figure 2:
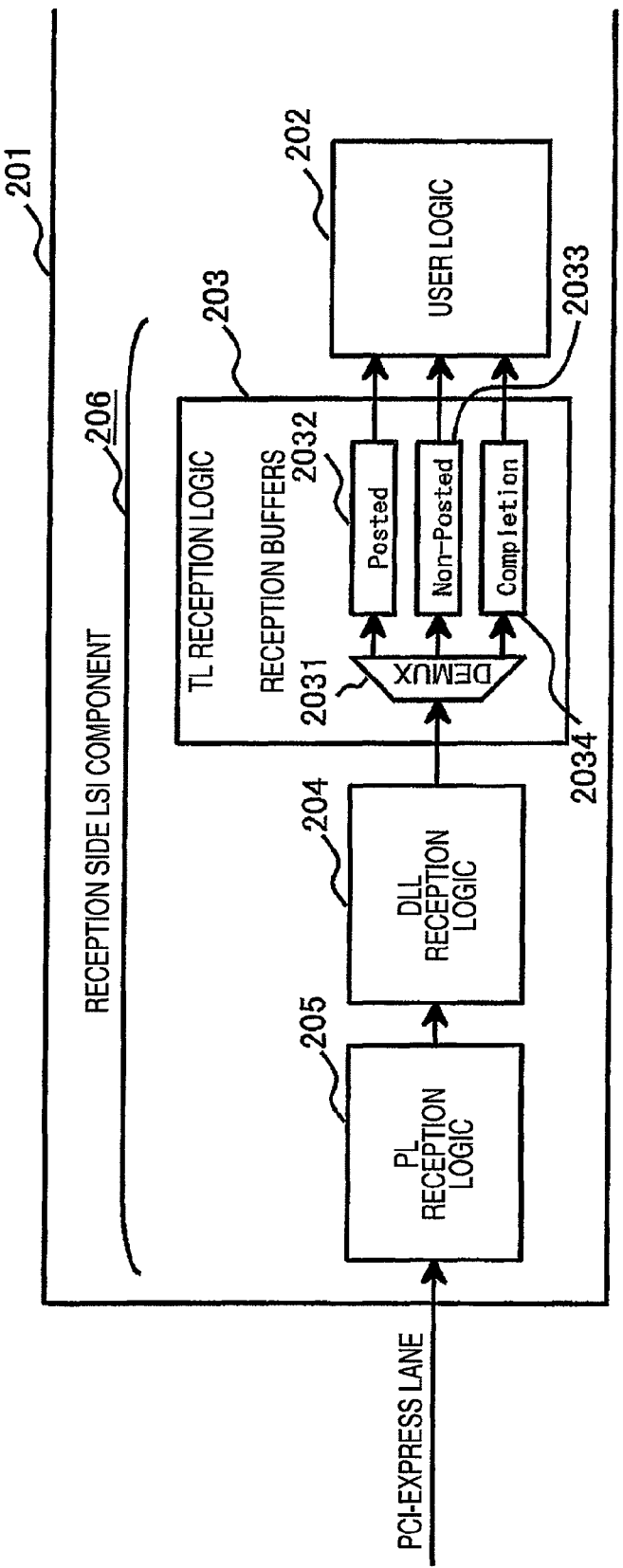
FIG. 2 is a configural diagram of a conventional reception side LSI component.
Figure 4:
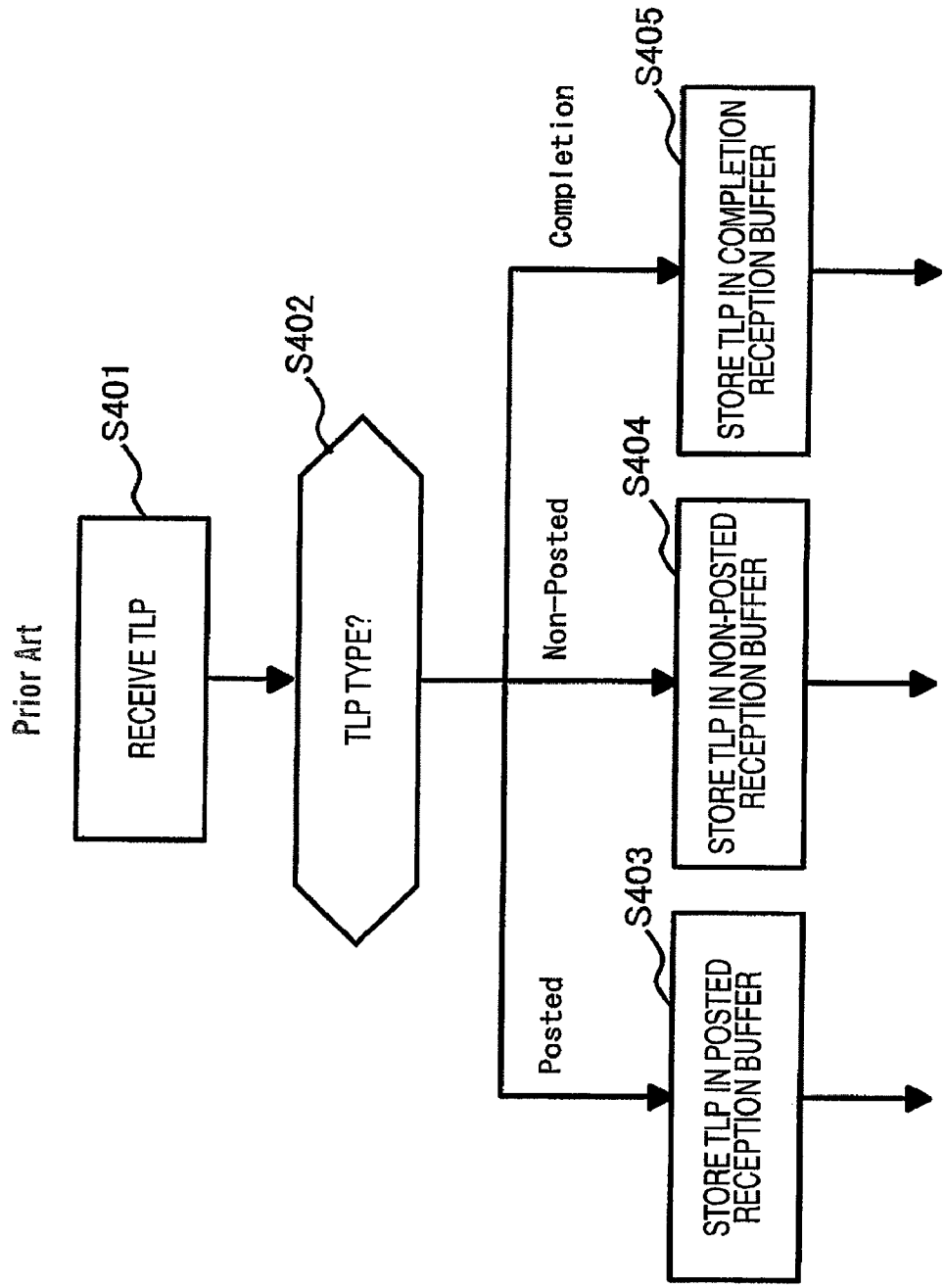
FIG. 4 shows a flow of processing that is performed by the conventional reception side LSI component.

When the TL reception logic 703 shown in FIG. 7 and the TL reception logic 203 shown in FIG. 2 are compared and when the flow shown in FIG. 9 and the flow shown in FIG. 4 are compared, it can be expected that the TL reception logic 703 is realized even without changing the logic itself of the TL reception logic 203 (in other words, by excluding the Non-Posted reception buffer and the Completion reception buffer). It will be noted that, in FIG. 7, it is alright even if there is no DEMUX 2031 in the TL reception logic 703. When there is no DEMUX 2031, it can be expected that the mounting area of the PCI-Express interface circuit component 706 is controlled even more.

Incidentally, a value that represents the HSNP type is set in the higher-level 4 bits of the CMD field shown in FIG. 11, but another type of information, such as CMD definition information, for example, is set in a place other then the higher-level 4 bits of the CMD field. As the CMD definition information, for example, there are register write, data read, data write, register read and HSNP reply. "Register write" is, for example, writing of control information in the register. "Data read" is reading of user data. "Data write" is writing of user data. "Register read" is, for example, reading of control information from the register. "HSNP reply" is a reply with respect to an HSN-Non-Posted-HSNP.

FIG. 12 shows the relationship between HSNP types and CMD definition information.

In the case of register read and data read, it is necessary to receive control information or user data as the reply, so HSN-Non-Posted, which is a type that requires a reply, is employed as the HSNP type. Further, in the case of HSNP reply, HSN-Completion, which is a type that means a reply, is employed.

In the case of register write and data write, HSN-Posted can be employed, but in the case of data write, it is thought that it is preferable to receive a reply in order to ensure reliability, so HSN-Posted is employed in regard to register write, and HSN-Non-Posted is employed in regard to data write where reliability is desired more than register write.

Below, flows of register write processing, data read processing and data write processing will be described.

Figure 13:
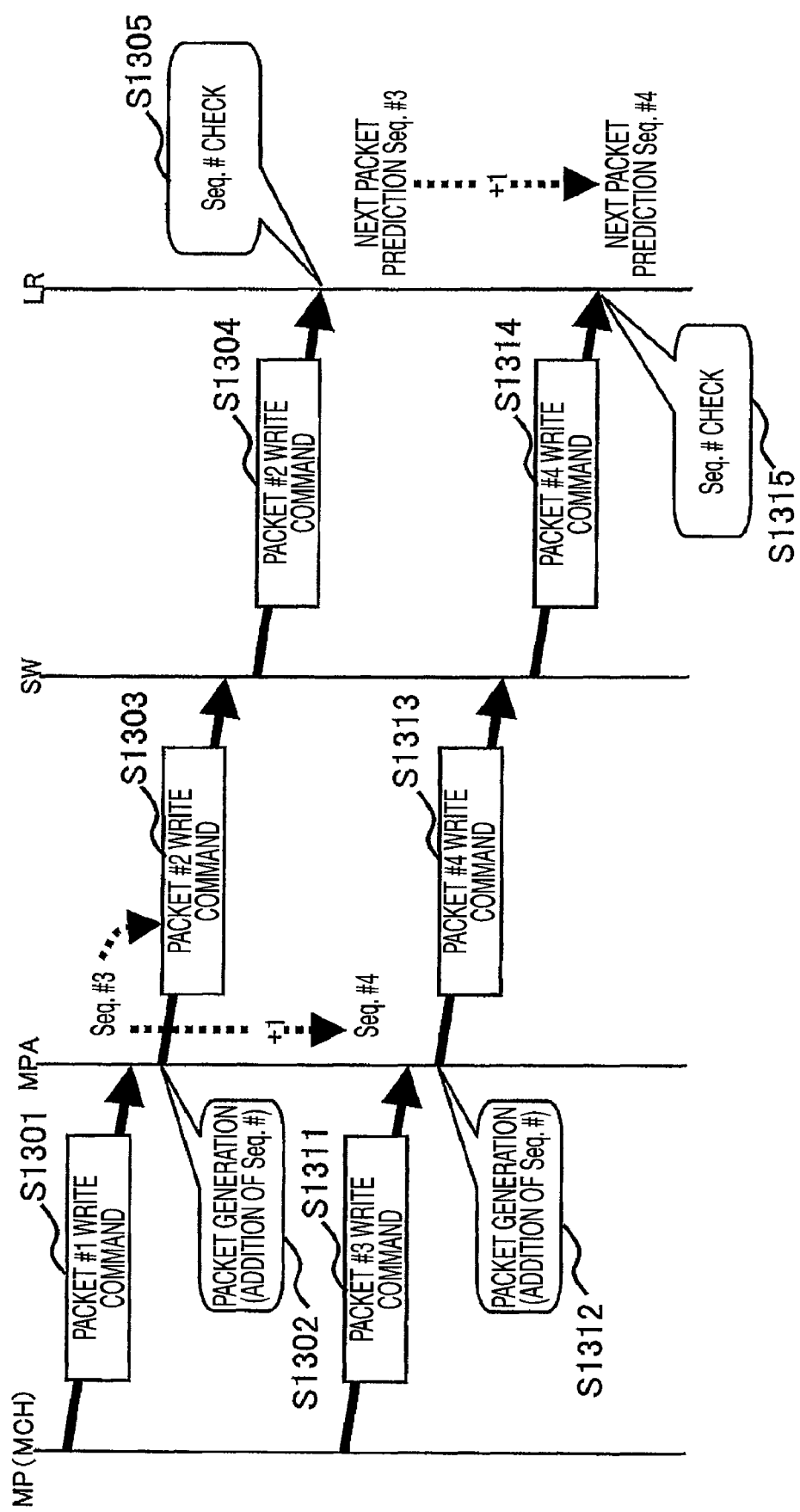
FIG. 13 shows a flow of register write processing.

FIG. 13 shows a flow of register write processing.

For example, when an IO command is received by the CHA 5011, the CHA 5011 notifies the MP 5018 that it has received an IO command, the MP 5018 transmits to the MPA 5016 a Posted-TLP that includes control information that represents a command that follows that IO command and a value that means write (S1301).

The MPA 5016 receives the Posted-TLP, so the HSNP generation component 60212 inside the MPA 5016 generates a Posted-HSNP as an HSNP that corresponds to that. The aforementioned control information is set in the HSN data portion 17022 of this HSNP. The TLP generation component 60213 generates a Posted-TLP that includes that Posted-HSNP (S1302) and transmits the Posted-TLP to that MPA 5016 and the LR 5011 (or 5012) that includes the writing destination register of the aforementioned control information (S1303). At the time of generation of the HSNP, a sequence number of the HSNP is set in the HSN header portion 17021, for example. Further, transmission destination information that represents the transmission destination LR 5011 (or 5012), for example, is set in the TLP header portion 1701 of the Posted-TLP that is transmitted.

The SW 5013 receives the Posted-TLP that has been transmitted from the MPA 5016. The SW 5013 transfers that Posted-TLP to the transmission destination LR 5011 (or 5012) that the transmission destination information inside that Posted-TLP represents (S1304).

The transmission destination LR 5011 (or 5012) receives the Posted-TLP that has been transferred from the SW 5013. In the transmission destination LR 5011, it is judged whether or not the sequence number that is included in the Posted-HSNP inside the Posted-TLP that has been received is the same as a predicted sequence number (S1305). For example, when the immediately prior sequence number is K−1 (e.g., K=3), the predicted sequence number this time is K, and when the sequence number that is included in the Posted-HSNP is also K, it matches the predicted sequence number.

Next, when the aforementioned S1301 to S1305 are performed (S1311 to S1315), the sequence number that is set in the HSNP becomes K+1 (=4), and similarly the predicted sequence number also becomes K+1.

As described above, in register write, a Posted-HSNP that does not require a reply is generated and, therefore, as shown in FIG. 13, even when the Posted-HSNP is processed by the transmission destination LR 5011 (or 5012), a reply is not sent from the transmission destination LR 5011 to the MPA 5016.

Figure 14:
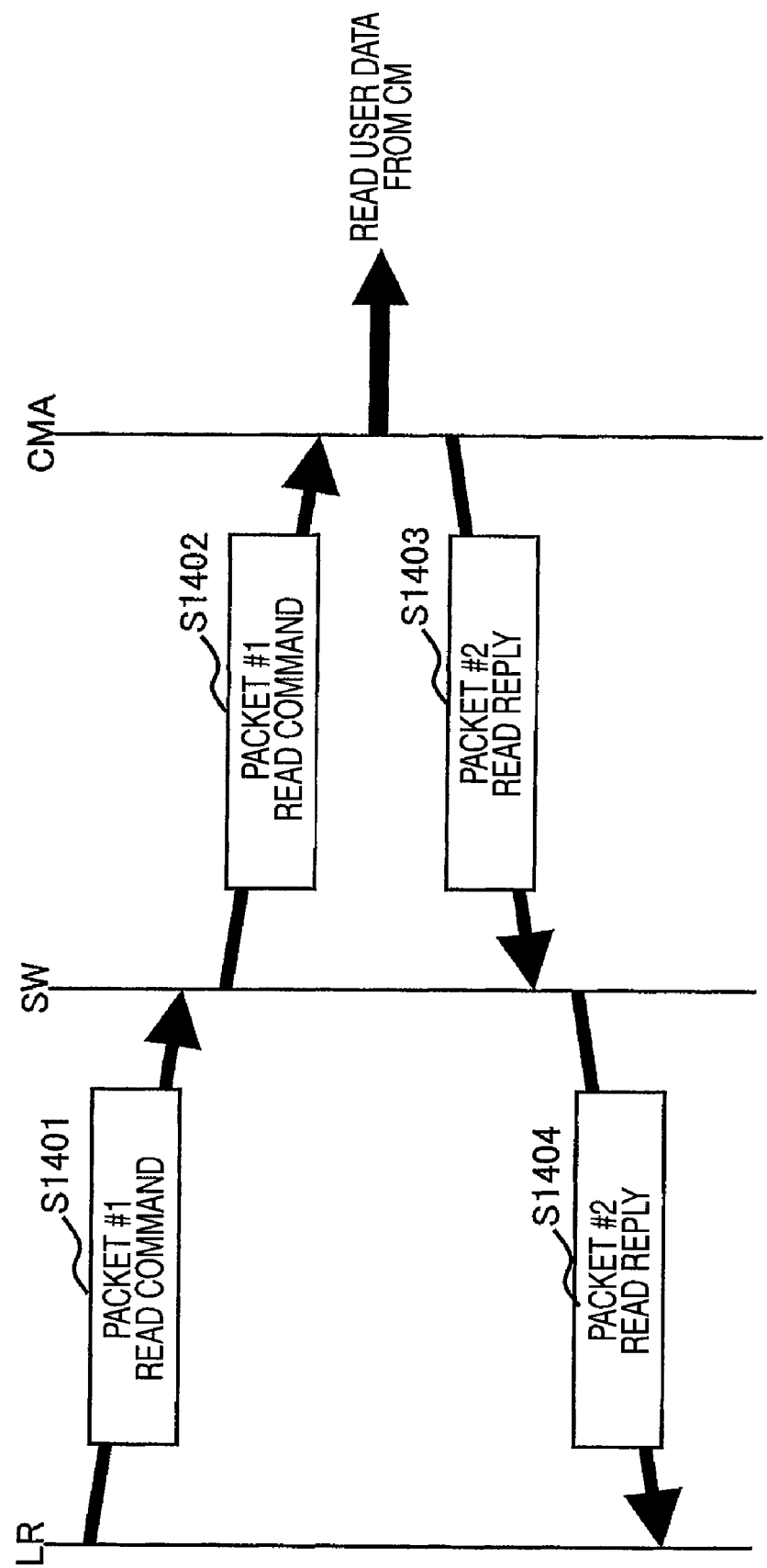
FIG. 14 shows a flow of data read processing.

FIG. 14 shows a flow of data read processing.

The HSNP generation component 60212 inside the LR 5011 (or 5012) generates, when the control information from the MP 5018 represents data read, for example, a Non-Posted-HSNP that includes that control information. The Posted-TLP that includes that Non-Posted-HSNP is transmitted from the LR 5011 (or 5012) via the SW 5013 to the CMA 5014 that is the transmission destination of that TLP (S1401 and S1402).

The CMA 5014 reads the user data from the CM 5015 in accordance with the Non-Posted-HSNP inside that Posted-TLP. The HSNP generation component 60212 inside the CMA 5014 generates a Completion-HSNP that includes the user data that have been read. The Posted-TLP that includes that Completion-HSNP is transmitted from the CMA 5014 via the SW 5013 to the LR 5011 (or 5012) that is the transmission source of the aforementioned Non-Posted-HSNP (S1403 and S1404).

Figure 15:
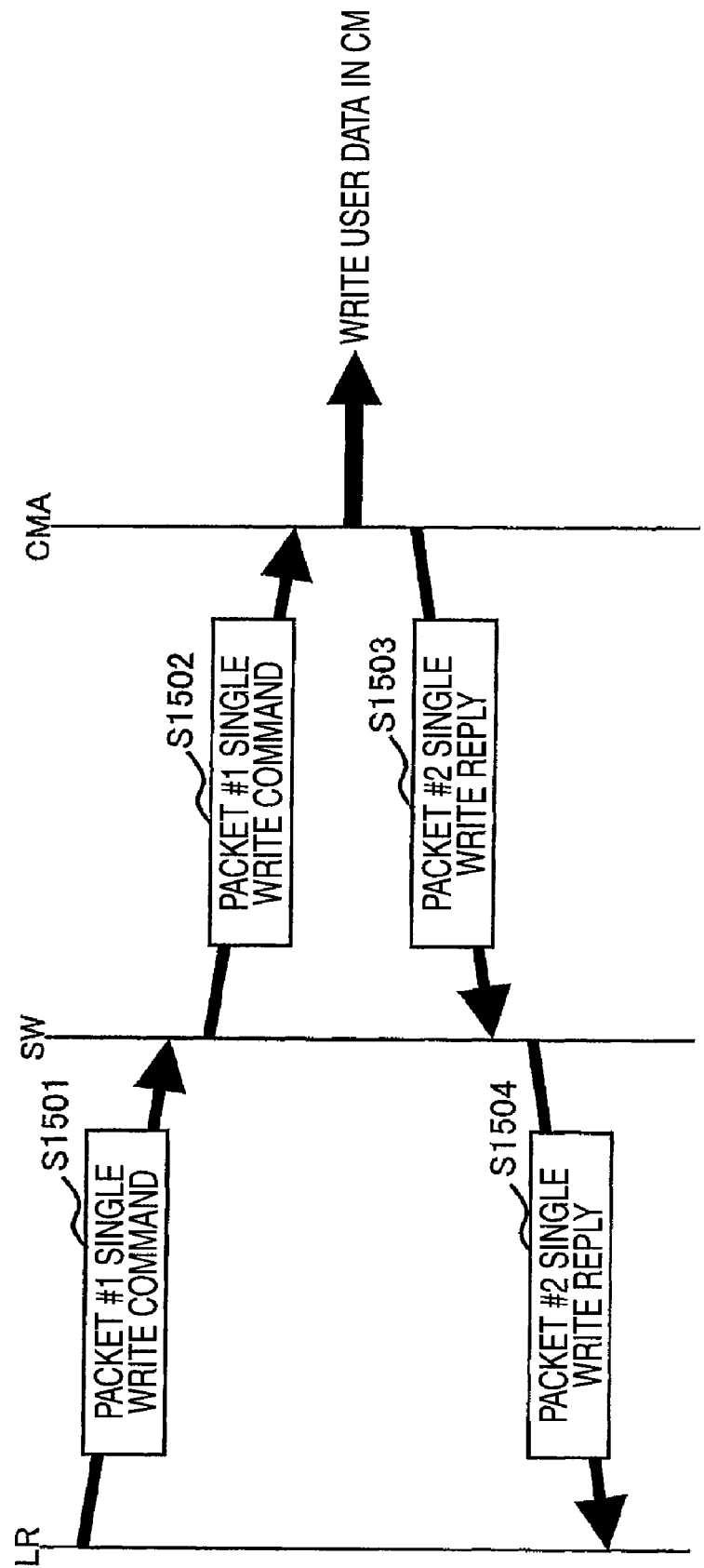
FIG. 15 shows a flow of single data write processing.

FIG. 15 shows a flow of single data write processing.

In single data write processing, a TLP is transmitted only with respect to one CMA 5014 of CMAs 5014 and 5014 that are doubled, for example. As a case where first data write processing is performed, for example, there is a case where failure occurs in the other of the CMAs 5014 and 5014 that are doubled. When the MP 5018 detects failure of the other CMA 5014, for example, the MP 5018 issues to the LR 5011 (or 5012) control information that represents single data write.

When the LR 5011 (or 5012) receives from the MPA 5016 the Posted-HSNP that includes control information that represents single data write (specifically, when control information that represents single data write is identified by the HSNL reception logic 7021 inside the LR 5011 (or 5012)), the HSNP generation component 60212 inside that LR 5011 (or 5012) generates a Non-Posted-HSNP that includes the control information that represents single data write. The reason that the Non-Posted-HSNP is generated is, as mentioned previously, for ensuring reliability. A Posted-TLP that includes that Non-Posted-HSNP is generated and is transmitted from the LR 5011 (or 5012) via the SW 5013 to the one CMA 5014 (S1501 and S1502).

The CMA 5014 writes in the CM 5015 the user data inside that Non-Posted-HSNP in accordance with the Non-Posted-HSNP inside that Posted-TLP. The HSNP generation component 60212 inside the CMA 5014 generates a Completion-HSNP that includes information that means the completion of the writing of the user data. The Posted-TLP that includes that Completion-HSNP is transmitted from the CMA 5014 via the SW 5013 to the LR 5011 (or 5012) that is the transmission source of the aforementioned Non-Posted-HSNP (S1503 and S1504).

Figure 16:
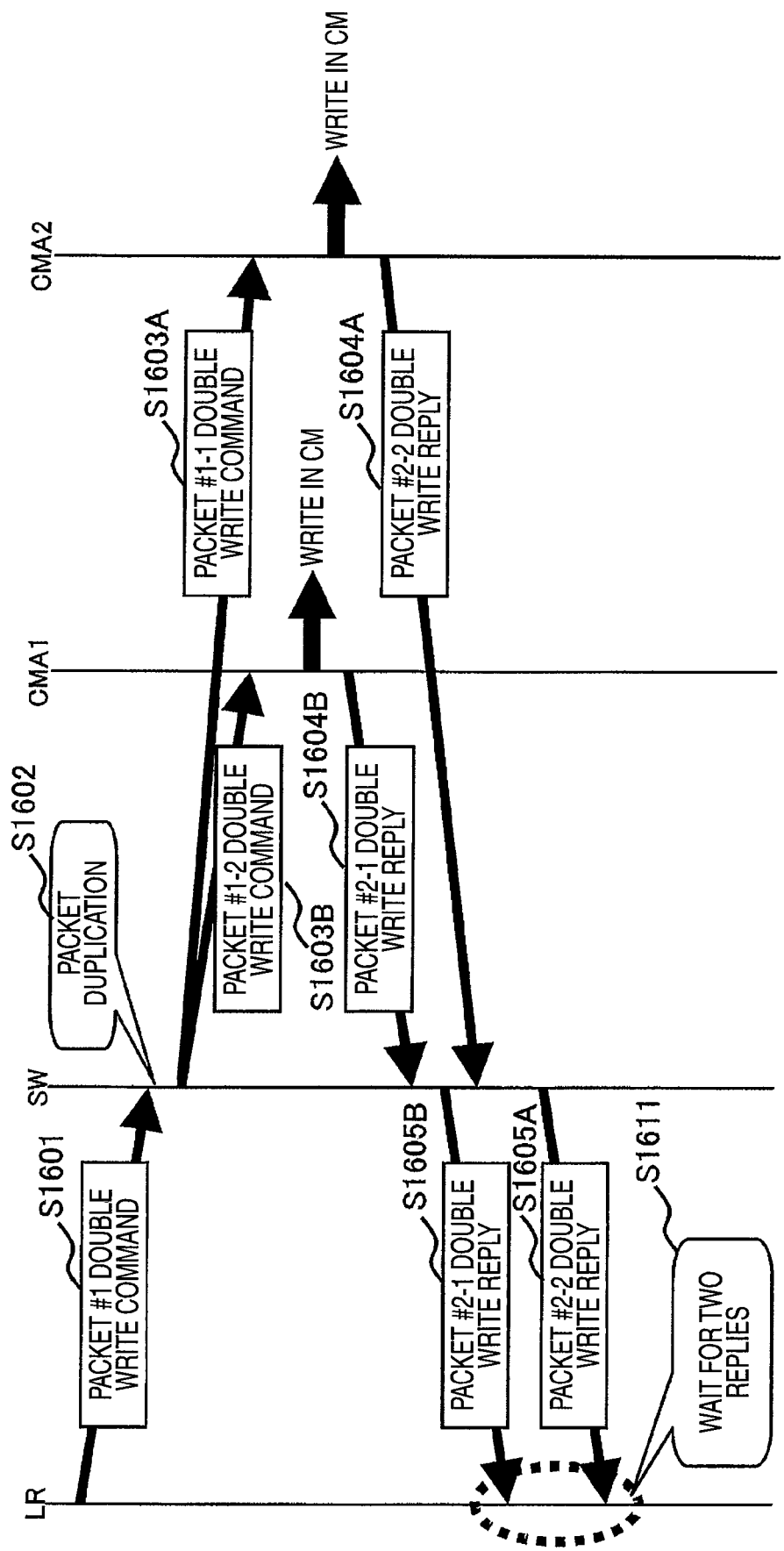
FIG. 16 shows a flow of double data write processing.

FIG. 16 shows a flow of double data write processing.

In double data write processing, a TLP is transmitted with respect to both CMAs 5014 of CMAs 5014 and 5014 that are doubled, for example. In the present embodiment, basically double data write processing is performed, and when failure occurs in either of the CMAs 5014, single data write is performed.

When the LR 5011 (or 5012) receives from the MPA 5016 a Posted-HSNP that includes control information that represents double data write (specifically, when control information that represents double data write is identified by the HSNL reception logic 7021 inside the LR 5011 (or 5012)), the HSNP generation component 60212 inside that LR 5011 (or 5012) generates a Non-Posted-HSNP that includes the control information that represents double data write. A Posted-TLP that includes that Non-Posted-HSNP is generated and is transmitted from the LR 5011 (or 5012) to the SW 5013 (S1601).

When the SW 5013 identifies the Non-Posted-HSNP that includes the control information that represents double data write, the SW 5013 creates a duplicate of the Posted-TLP that has been received (S1602). The SW 5013 transfers one of the Posted-TLPs to one of the CMAs 5014 (CMA 2) (S1603A) and transfers the other of the Posted-TLPs to the other of the CMAs 5014 (CMA 1) (S1603B).

The one CMA 5014 (CMA 2) writes in the CM 5015 the user data inside that Non-Posted-HSNP in accordance with the Non-Posted-HSNP inside that Posted-TLP. The HSNP generation component 60212 inside the one CMA 5014 (CMA 2) generates a Completion-HSNP that includes information that means completion of the writing of the user data. The Posted-TLP that includes that Completion-HSNP is transmitted from the CMA 5014 via the SW 5013 to the LR 5011 (or 5012) that is the transmission source of the aforementioned Non-Posted-HSNP (S1604A and S1605A). The same processing is performed in regard also to the other CMA 5014 (CMA 1) (S1603B, S1604B and S1605B).

The transmission source LR 5011 (or 5012) waits for two replies (Posted-TLPs that include a Completion-HSNP) when, even if there is one Posted-TLP that has been transmitted, a Non-Posted-HSNP that includes control information that represents double data write is included in that TLP (S1611). When the transmission source LR 5011 (or 5012) receives two replies, double data write processing normally ends.

A preferred embodiment of the present invention has been described above, but the present invention is not limited to this embodiment and, it goes without saying, is capable of being variously changed in a range that does not depart from the gist thereof.

What is claimed is:

1. A storage system that is connected to a higher-level device, the storage system comprising:
a plurality of storage devices; and
a controller that receives an access request from the higher-level device and accesses any one or more storage devices of the plurality of storage devices in accordance with the access request,
wherein the controller includes plural integrated circuits that include a transmission side integrated circuit component and a reception side integrated circuit component,
wherein the transmission side integrated circuit component includes:
a transmission side first circuit component that generates a first packet that follows a request; and
a transmission side second circuit component that is a lower-level circuit component of the transmission side first circuit component, includes a transmission buffer, and temporarily stores in the transmission buffer, and transmits, a second packet that includes the first packet,
wherein the reception side integrated circuit component includes;
a reception side second circuit component that includes a reception buffer, and receives and stores in the reception buffer, the second packet from the transmission side second circuit component; and
a reception side first circuit component that is a higher-level circuit component of the reception side second circuit component, and processes the first packet that is included inside the second packet that the reception side second circuit component has received,
wherein the first packet includes a parameter value that represents, of a plurality of first packet types that respectively correspond to a plurality of second packet types, a first packet type that follows the request,
wherein the second packet includes a second header portion and a second data portion,
wherein the second data portion that is included in the second packet that is transmitted from the transmission side second circuit component includes the first packet, and the second header portion includes a predetermined value as a parameter value that represents the type of the second packet,
wherein the predetermined value is a value that represents a predetermined one second packet type of the plurality of second packet types,
wherein the controller includes a microprocessor that processes the access request, a cache memory that temporarily stores data that is to be written in the one or more storage devices or has been read from the one or more storage devices in accordance with the access request, one or more higher-level adapters that are one or more interface circuits that are connected to the higher-level device, and one or more lower-level adapters that are connected to the one or more storage devices of the plurality of storage devices,
wherein the one or more higher-level adapters and the one or more lower-level adapters are the integrated circuits,
wherein each of the integrated circuits includes the transmission side integrated circuit component and the reception side integrated circuit component,
wherein the transmission side first circuit component and the reception side first circuit component are application layer circuit components,
wherein the transmission side second circuit component and the reception side second circuit component are the transaction layer circuit components of transaction layer circuit components, data link layer circuit components and physical layer circuit components that are included in a PCI-Express interface circuit component, wherein the plurality of second packet types are Posted, Non-Posted and Completion, and wherein the predetermined value is a value that represents Posted.

2. The storage system of claim 1, wherein the plural first packet types are types that include application Posted which is a first packet type that corresponds to the Posted, application Non-Posted which is a first packet type that corresponds to the Non-Posted, and application Completion which is a first packet type that corresponds to the Completion, wherein the controller includes a CM adapter that is an interface circuit with respect to the cache memory and an MP adapter that is an interface circuit with respect to the microprocessor, wherein the CM adapter and the MP adapter are the integrated circuits, wherein the higher-level adapter includes a memory, wherein the first packet includes a first data portion and a first header portion, wherein when the microprocessor writes control information that relates to control of the higher-level adapter in the memory of the higher-level adapter, the transmission side first circuit component inside the MP adapter generates a first packet that follows (4-1) and (4-2) below:

(4-1) the first data portion includes the control information;

(4-2) the first header portion includes, as a parameter value that represents the type of the first packet, a parameter value that represents the application Posted and includes, as a command type, a parameter value that represents a write command, and wherein the transmission side second circuit component inside the higher-level adapter transmits to the higher-level adapter the second packet that includes the first packet that follows (4-1) and (4-2).

3. The storage system of claim 2, wherein when the control information inside the first packet that follows (4-1) and (4-2) that is included in the second packet that has been transmitted from the MP adapter to the higher-level adapter is information that represents that write target data that follow the access request are to be written in the cache memory, the transmission side first circuit component inside the higher-level adapter generates a first packet that follows (5-1) and (5-2) below:

(5-1) the first data portion includes the write target data;

(5-2) the first header portion includes, as a parameter value that represents the type of the first packet, a parameter value that represents the application Non-Posted and includes, as a command type, a parameter value that represents a write command, and wherein the transmission side second circuit component inside the higher-level adapter transmits to the CM adapter the second packet that includes the first packet that follows (5-1) and (5-2), and wherein when the write target data have been written in the cache memory by the CM adapter that has received the second packet, the transmission side first circuit component inside the CM adapter generates a first packet that follows (5-3) below:

(5-3) the first header portion includes, as a parameter value that represents the type of the first packet, a parameter value that represents the application Completion;

wherein the transmission side second circuit component inside the CM adapter transmits to the higher-level adapter the second packet that includes the first packet that follows (5-3).

4. The storage system of claim 1, wherein the transmission side first circuit component and the reception side first circuit component are application layer circuit components, and wherein the transmission side second circuit component and the reception side second circuit component are the transaction layer circuit components of transaction layer circuit components, data link layer circuit components, and physical layer circuit components that are included in a PCI-Express interface circuit component.

5. The storage system of claim 4, wherein the plurality of second packet types are Posted, Non-Posted and Completion, and wherein the predetermined value is a value that represents Posted.

6. The storage system of claim 5, wherein the transmission side first circuit component generates a first packet that follows (8-1) and (8-2) below when writing control information and generates a first packet that follows (8-3) and (8-4) below when writing user data:

(8-1) the first data portion includes the control information;

(8-2) the first header portion includes, as a parameter value that represents the type of the first packet, a parameter value that represents a first packet type that corresponds to the Posted;

(8-3) the first data portion includes the user data; and (8-4) the first header portion includes, as a parameter value that represents the type of the first packet, a parameter value that represents a first packet type that corresponds to the Non-Posted.

7. The storage system of claim 1, wherein the plurality of second packet types are a second packet type that does not require a reply, a second packet type that requires a reply and a second packet type that represents a reply, and wherein the predetermined value is a value that represents a second packet type that does not require a reply.

8. The storage system of claim 7, wherein the transmission side first circuit component generates a first packet that follows (10-1) and (10-2) below when writing a first type of data and generates a first packet that follows (10-3) and (10-4) below when writing the second type of data:

(10-1) the first data portion includes the first type of data;

(10-2) the first header portion includes, as a parameter value that represents the type of the first packet, a parameter value that represents a first packet type that corresponds to a second packet type that does not require a reply;

(10-3) the first data portion includes the second type of data; and (10-4) the first header portion includes, as a parameter value that represents the type of the first packet, a parameter value that represents a first packet type that corresponds to a second packet type that requires a reply.

9. A transmitting device comprising:

a transmission side first circuit component that generates a first packet that follows a request; and a transmission side second circuit component that is a lower-level circuit component of the transmission side first circuit component, includes a transmission buffer and temporarily stores in the transmission buffer, and transmits, a second packet that includes the first packet, wherein the first packet includes a parameter value that represents, of a plurality of first packet types that respectively correspond to a plurality of second packet types, a first packet type that follows the request, wherein the second packet includes a second header portion and a second data portion, wherein the second data portion inside the second packet that is transmitted from the transmission side second circuit component includes the first packet, and the second header portion includes a predetermined value as a parameter value that represents the type of the second packet, and wherein the predetermined value is a value that represents a predetermined one second packet type of the plurality of second packet types, wherein a controller receives an access request from a higher-level device and accesses one or more storage devices of a plurality of storage devices in accordance with the access request, wherein the controller includes a microprocessor that processes the access request, a cache memory that temporarily stores data that is to be written in the one or more storage devices or has been read from the one or more storage devices in accordance with the access request, one or more higher-level adapters that are one or more interface circuits that are connected to the higher-level device, and one or more lower-level adapters that are connected to the one or more storage devices of the plurality of storage devices, wherein the one or more higher-level adapters and the one or more lower-level adapters are the integrated circuits, wherein each of the integrated circuits includes the transmission device and a receiving device, wherein the transmission side first circuit component and a reception side first circuit component of the receiving device are application layer circuit components, wherein the transmission side second circuit component and the reception side second circuit component are the transaction layer circuit components of transaction layer circuit components, data link layer circuit components and physical layer circuit components that are included in a PCI-Express interface circuit component, wherein the plurality of second packet types are Posted, Non-Posted and Completion, and wherein the predetermined value is a value that represents Posted.

10. A transceiving device comprising:
a transmission side first circuit component that generates a first packet that follows a request;
a transmission side second circuit component that is a lower-level circuit component of the first circuit component, includes a transmission buffer and temporarily stores in the transmission buffer, and transmits, a second packet that includes the first packet;
a reception side second circuit component that includes a reception buffer and receives, and stores in the reception buffer, a second packet from an external device; and
a reception side first circuit component that is a higher-level circuit component of the reception side second circuit component and processes a first packet that is included in the second packet that the reception side second circuit component has received, wherein the first packet includes a parameter value that represents, of a plurality of first packet types that respectively correspond to a plurality of second packet types, a first packet type that follows the request, wherein the second packet includes a second header portion and a second data portion, wherein the second data portion inside the second packet that is transmitted from the transmission side second circuit component includes the first packet, and the second header portion includes a predetermined value as a parameter value that represents the type of the second packet, wherein the predetermined value is a value that represents a predetermined one second packet type of the plural second packet types, wherein a controller receives an access request from a higher-level device and accesses one or more storage devices of a plurality of storage devices in accordance with the access request, wherein the controller includes a microprocessor that processes the access request, a cache memory that temporarily stores data that is to be written in the one or more storage devices or has been read from the one or more storage devices in accordance with the access request, one or more higher-level adapters that are one or more interface circuits that are connected to the higher-level device, and one or more lower-level adapters that are connected to the one or more storage devices of the plurality of storage devices, wherein the one or more higher-level adapters and the one or more lower-level adapters are the integrated circuits, wherein each of the integrated circuits includes a transmission side integrated circuit component and a reception side integrated circuit component, the transmission side integrated circuit component including the transmission side first circuit component and the transmission side second circuit component, and the reception side integrated circuit component including the reception side first circuit component and the reception side second circuit component, wherein the transmission side first circuit component and the reception side first circuit component are application layer circuit components, wherein the transmission side second circuit component and the reception side second circuit component are the transaction layer circuit components of transaction layer circuit components, data link layer circuit components and physical layer circuit components that are included in a PCI-Express interface circuit component, wherein the plurality of second packet types are Posted, Non-Posted and Completion, and wherein the predetermined value is a value that represents Posted.

11. A receiving device comprising:
a reception side second circuit component that includes a reception buffer, and receives and stores in the reception buffer, a second packet from a transmitting device; and
a reception side first circuit component that is a higher-level circuit component of the reception side second circuit component and processes a first packet that is included in a data portion inside the second packet that the reception side second circuit component has received, wherein the second packet includes a second header portion and the second data portion, wherein the second data portion includes a first packet, wherein the first packet includes a parameter value that represents any of a plurality of first packet types that respectively correspond to a plurality of second packet types, wherein the second header portion inside the second packet includes as a parameter value that represents the type of the second packet, a predetermined value regardless of the parameter value that represents the first packet type that is included in the first packet, wherein the predetermined value is a value that represents a predetermined one second packet type of the plurality of second packet types, wherein a controller receives an access request from a higher-level device and accesses one or more storage devices of a plurality of storage devices in accordance with the access request, wherein the controller includes a microprocessor that processes the access request, a cache memory that temporarily stores data that is to be written in the one or more storage devices or has been read from the one or more storage devices in accordance with the access request, one or more higher-level adapters that are one or more interface circuits that are connected to the higher-level device, and one or more lower-level adapters that are connected to the one or more storage devices of the plurality of storage devices, wherein the one or more higher-level adapters and the one or more lower-level adapters are the integrated circuits, wherein each of the integrated circuits includes a transmitting device and the receiving device, wherein a transmission side first circuit component of the transmitting device and the reception side first circuit component are application layer circuit components, wherein the transmission side second circuit component and the rece side second circuit component are the transaction layer circuit components of transaction layer circuit components, data link layer circuit components and physical layer circuit components that are included in a PCI-Express interface circuit component, wherein the plurality of second packet types are Posted, Non-Posted and Completion, and wherein the predetermined value is a value that represents Posted.

* * * * *